No. 820,305. PATENTED MAY 8, 1906.
E. HERMON.
AUTOMATIC CHECK ROW CORN PLANTER AND MARKER.
APPLICATION FILED SEPT. 2, 1905.

2 SHEETS—SHEET 1.

Witnesses: Inventor: Ezra Hermon,
By Thomas G. Orwig, Attorney.

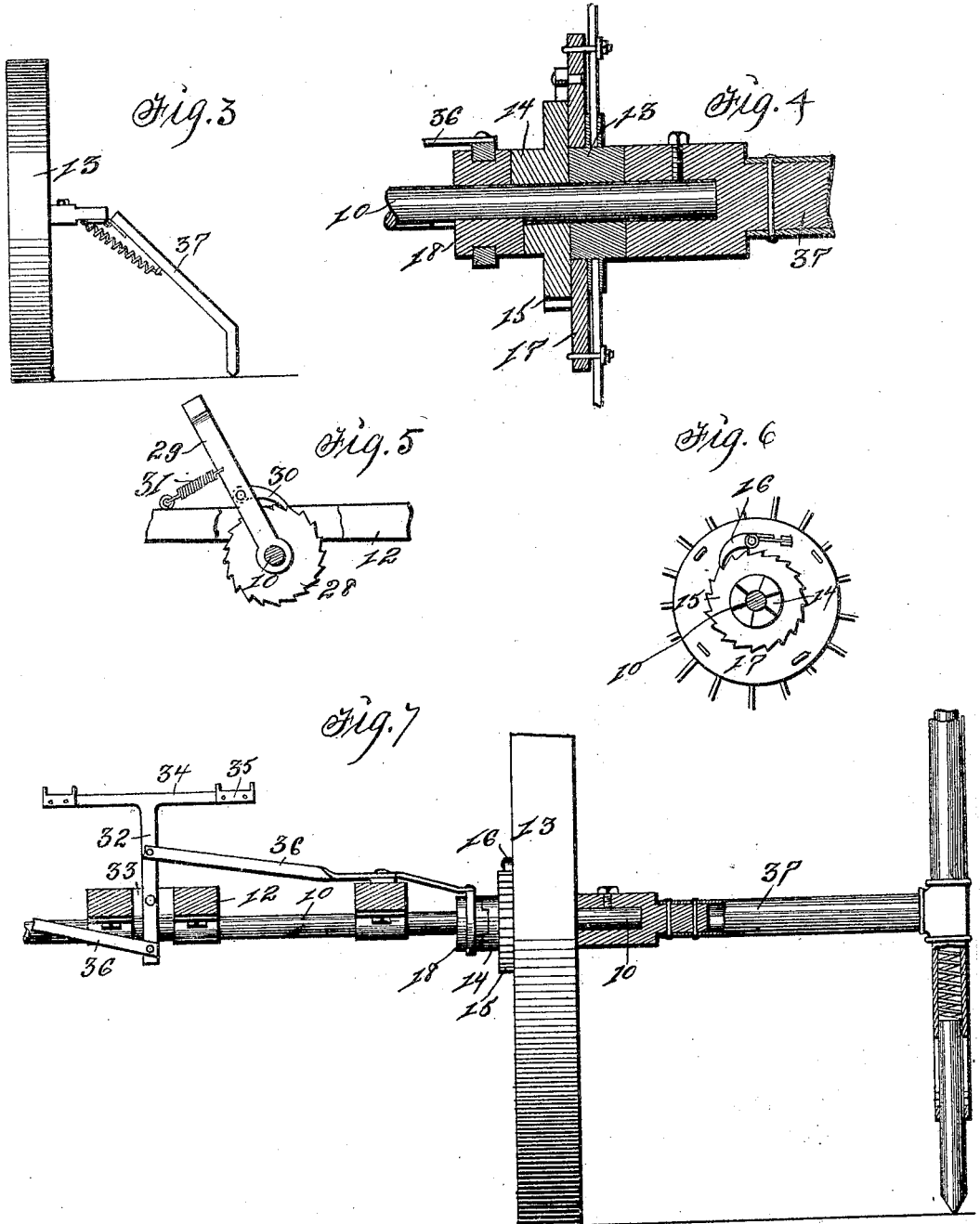

UNITED STATES PATENT OFFICE.

EZRA HERMON, OF WINTERSET, IOWA.

AUTOMATIC CHECK-ROW CORN-PLANTER AND MARKER.

No. 820,305.  Specification of Letters Patent.  Patented May 8, 1906.

Application filed September 2, 1905. Serial No. 276,889.

*To all whom it may concern:*

Be it known that I, EZRA HERMON, a citizen of the United States, residing at Winterset, in the county of Madison and State of Iowa, have invented a new and useful Automatic Check-Row Corn-Planter and Marker, of which the following is a specification.

My object is to combine simple mechanism with the carriage of a corn-planter to automatically rock a shaft at regular intervals to drop seeds at equal distances apart, as required to produce check-rows; also, to combine markers with the rotatable bearing-wheel axle to make indentations in the surface of the ground in parallel lines with the line of advance, as required to serve as guides in making return trips across a field, and also to provide means for adjusting the axle and markers, as required to compensate for loss or gain of space between the points where seeds are dropped.

My invention consists in the construction, arrangement, and combination of elements and subcombinations, as hereinafter set forth, pointed out in my claims, and illustrated in the accompanying drawings, in which—

Figure 1:
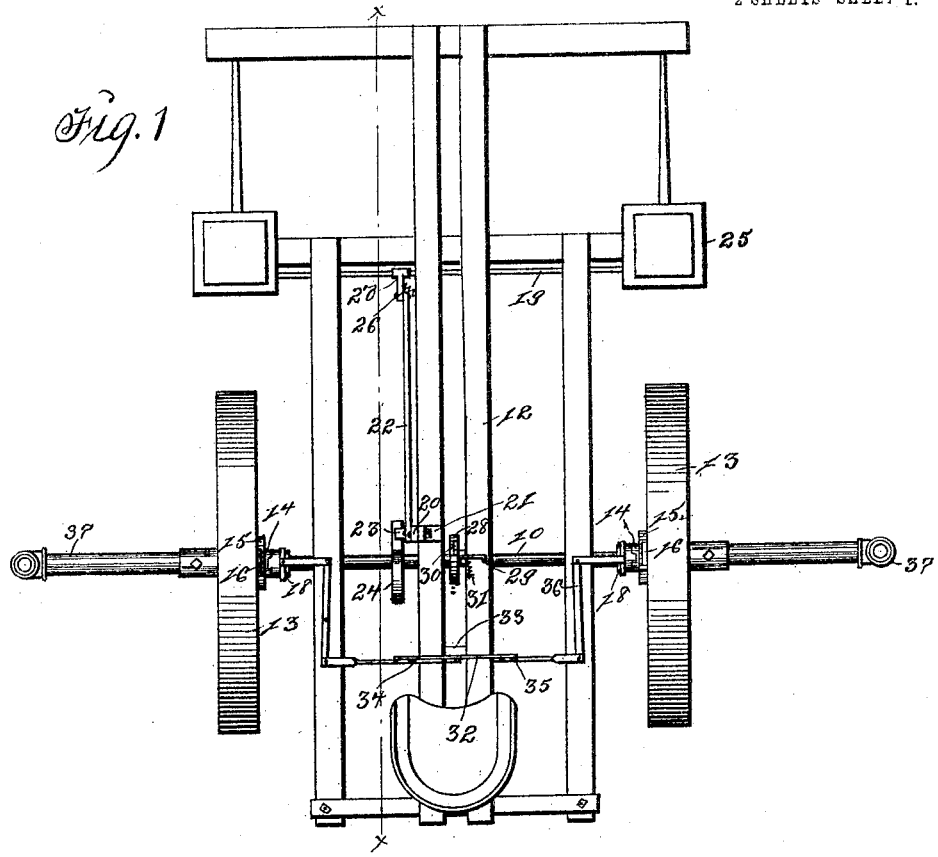
Figure 2:
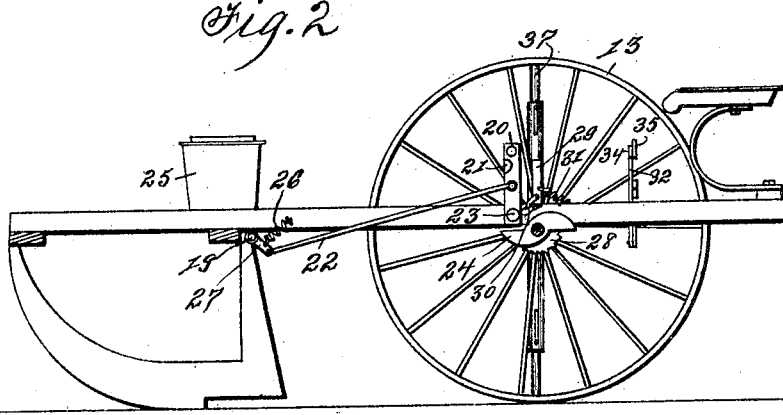

Figure 1 is a top view of the planter and shows the positions of all the operative parts relative to each other and the carriage-frame. Fig. 2 is a sectional view on the line $xx$ of Fig. 1 and shows the connection between the rock-shaft mounted on the runner-frame and the mechanism connected with the rotatable bearing-wheel axle. Fig. 3 shows a marker adjustably connected with the end of the rotatable axle, as required to revolve with the axle. Fig. 4 is an enlarged sectional view that shows how a carriage-wheel, a ratchet-wheel, a clutch and a marker are combined with the rotatable bearing-wheel axle. Fig. 5 is a detail view that shows a ratchet-wheel fixed to the rotatable bearing-wheel axle and means for rotating the axle while the bearing-wheels are advancing, as required to regain lost space between the points where seeds are dropped. Fig. 6 shows the manner of fixing a ratchet-wheel to the spokes of a bearing-wheel, and Fig. 7 is an enlarged view that shows a modified form of marker and means for operating the clutches connected with the bearing-wheels.

The numeral 10 designates a rotatable bearing-axle, and 12 a bearing-frame. Bearing-wheels 13 are loosely mounted on the axle 10, and clutch members 14 to the inside ends of their hubs are detachably connected with the wheels by means of a ratchet-wheel 15, that is integral with the hub of the bearing-wheel, and a spring-actuated pawl 16, pivoted to a disk 17, that is fixed to the spokes of the bearing-wheel, as shown in Fig. 6. Mating clutch members 18 are slidably connected with the axle 10.

A rock-shaft 19 in bearings fixed to the frame 12 is connected with a lever 20, pivoted to the upper end of a bearer 21, fixed on the frame 12 by means of a rod 22. A stud 23 projects laterally from the lower end of the lever 20, and a duplex cam 24, fixed on the rotatable axle 10, engages the stud at every half-revolution of the axle, as required to vibrate the lever 20, and thereby impart motion to the rod 22, and hence to rock the shaft 19, as required for actuating seeddropping mechanism in the seedboxes 25.

A spring 26 is connected with the frame 12 and an arm 27, projecting from the rock-shaft 19, in such a manner that it will normally retain the arm 27 elevated and return the lever 20 to its normal perpendicular position every time motion is imparted to the rock-shaft by the forward motion of the rod 22.

To regain lost space by the slipping of the bearing-wheels on the ground or otherwise, a ratchet-wheel 28 is fixed to the axle 10, as shown in Fig. 5, and an elbow-shaped lever 29 is fulcrumed to the axle in such a manner that by foot-pressure on the horizontal portion of the lever the rotation of the axle will be stopped while the bearing-wheels rotate on the axle and advance and the markers on the outer ends of the axle will be retained stationary until the foot-pressure of the operator is relaxed. A gravitating pawl 30 engages the ratchet-wheel 28 when the lever 29 is pressed, and a spring 31 normally retains the lever and pawl in an inoperative position, as required to allow the axle 10 to rotate.

A lever 32 is pivoted to a bearer 33, fixed between parallel parts of the frame 12, as shown in Fig. 7, and has a cross-head 34 at its top and foot-rests 35 on its ends and is connected with the clutch members 18 by levers 36 in such a manner that downward pressure by the operator's foot at one end of the cross-head will disengage the sliding clutch members 18 from the members 14, as required to allow the bearing-wheels to rotate on the axle 10 and the bearing to advance while the axle 10 does not rotate, as required to increase the space between the points where seeds are dropped whenever they are dropped too close together and out of alinement with the cross-rows.

The markers 37 are adjustably and detachably connected with the ends of the axle 10, as shown in Figs. 3 and 7, in such a manner that when the axle revolves the end of the markers will at each revolution of the axle 10 enter the ground and make short furrows in the surface parallel with the line of advance, so that the marks thus made will serve as a means to direct the driver in making return trips across the field and as required to produce check-rows at uniform distances apart.

Having thus set forth the purpose of my invention and the construction and function of each element and the arrangement and combination of all the parts, the practical operation thereof will be obvious to persons familiar with the art to which it pertains.

What I claim as new, and desire to secure by Letters Patent, is—

1. In a check-row corn-planter and marker, a rotatable bearing-axle, markers connected with the ends of the axles, bearing-wheels loosely mounted on the axles, clutch members fixed to the hubs of the bearing-wheels, ratchet-wheels fixed to the bearing-wheels, pawls connected with the bearing-wheels to engage the ratchet-wheels, clutch members slidably connected with the axles and means for simultaneously moving the sliding clutch members in reverse ways, arranged and combined in the manner set forth for the purposes stated.

2. A check-row corn-planter and marker comprising a rock-shaft having an arm, a bar pivoted at its top to a fixed bearer and provided with a stud at its lower end to extend laterally, a rod connected with the lever and with the arm of the rock-shaft and a duplex cam on a rotatable bearing-axle and means to prevent the axle from rotating while the carriage is advancing, a rotatable bearing-axle, markers connected with the ends of the bearing-axle, bearing-wheels loosely mounted on the axle, clutch members fixed to the hubs of the bearing-wheels, ratchet-wheels fixed to the bearing-wheels, pawls connected with the bearing-wheels, clutch members slidingly connected with the axle and means for simultaneously moving the clutch members in reverse ways, arranged and combined as set forth.

EZRA HERMON.

Witnesses:
A. W. WILKINSON,
G. W. POFFINBARGER.